US012608497B2

(12) United States Patent
Ahmed et al.

(10) Patent No.: US 12,608,497 B2
(45) Date of Patent: Apr. 21, 2026

(54) CENTRAL DATA PROTECTION AND PRIVACY FRAMEWORK

(71) Applicant: SAP SE, Walldorf (DE)

(72) Inventors: Naved Ahmed, Bangalore (IN); Saritha Palli, Bangalore (IN)

(73) Assignee: SAP SE, Walldorf (DE)

( * ) Notice: Subject to any disclaimer, the term of this patent is extended or adjusted under 35 U.S.C. 154(b) by 213 days.

(21) Appl. No.: 18/527,062

(22) Filed: Dec. 1, 2023

(65) Prior Publication Data

US 2025/0181741 A1     Jun. 5, 2025

(51) Int. Cl.
*G06F 21/62* (2013.01)

(52) U.S. Cl.
CPC ................................. *G06F 21/6218* (2013.01)

(58) Field of Classification Search
CPC .................................................... G06F 21/6218
See application file for complete search history.

(56) References Cited

U.S. PATENT DOCUMENTS

| | | | | | |
|---|---|---|---|---|---|
| 5,799,297 | A | * | 8/1998 | Goodridge | G06Q 10/04 |
| 7,228,547 | B2 | * | 6/2007 | Yaung | G06F 9/548 |
| | | | | | 705/317 |
| 9,990,510 | B2 | * | 6/2018 | Bumbulis | G06F 16/21 |
| 10,019,241 | B2 | * | 7/2018 | Salvi | G06F 3/0484 |
| 11,244,367 | B2 | * | 2/2022 | Barday | G06Q 30/0609 |
| 11,444,976 | B2 | * | 9/2022 | Brannon | G06F 16/9577 |
| 11,526,624 | B2 | * | 12/2022 | Brannon | H04L 63/0227 |

| | | | | | |
|---|---|---|---|---|---|
| 2007/0033196 | A1 | * | 2/2007 | Moore | G06Q 10/06 |
| 2010/0100427 | A1 | * | 4/2010 | Mckeown | G06Q 10/067 |
| | | | | | 705/320 |
| 2010/0287014 | A1 | * | 11/2010 | Gaulin | G06F 16/338 |
| | | | | | 707/E17.014 |
| 2012/0060141 | A1 | * | 3/2012 | Demant | G06Q 10/06 |
| | | | | | 717/101 |
| 2012/0166983 | A1 | * | 6/2012 | Demant | G06F 21/6218 |
| | | | | | 715/764 |
| 2013/0159036 | A1 | * | 6/2013 | Keil | G06Q 10/06 |
| | | | | | 705/7.12 |
| 2014/0032600 | A1 | * | 1/2014 | Sarferaz | G06F 16/00 |
| | | | | | 707/E17.005 |
| 2014/0172918 | A1 | * | 6/2014 | Kornmann | G06F 21/6218 |
| | | | | | 707/785 |

(Continued)

*Primary Examiner* — Joseph P Hirl
*Assistant Examiner* — Aayush Aryal
(74) *Attorney, Agent, or Firm* — Fountainhead Law Group, PC

(57) ABSTRACT

A central framework unifies the data protection and privacy domain with the business domain using application objects and business scenarios. Application objects are linked to a particular data category, a name of a data object, and primary key attributes of the data object. Each data category is linked to a purpose. And business scenarios include a set of application objects and a sequence for the set. Worklist entries are generated in response to a particular instances of application objects being created or modified. For each worklist entry, purposes are determined for the particular application object using purpose assignment rules for the particular application object. Each of the determined purposes for the particular application object are stored in a purpose assignment table. Then each determined purpose are proposed for master data to be used across the plurality of different application.

20 Claims, 10 Drawing Sheets

100

(56)                    References Cited

U.S. PATENT DOCUMENTS

2014/0229920 A1*   8/2014  Rossi ................. G06F 11/3698
                                                    717/125
2015/0160974 A1*   6/2015  Kishore ............... G06F 9/4881
                                                    718/106
2017/0004317 A1*   1/2017  Bumbulis ........... G06F 21/6218

* cited by examiner

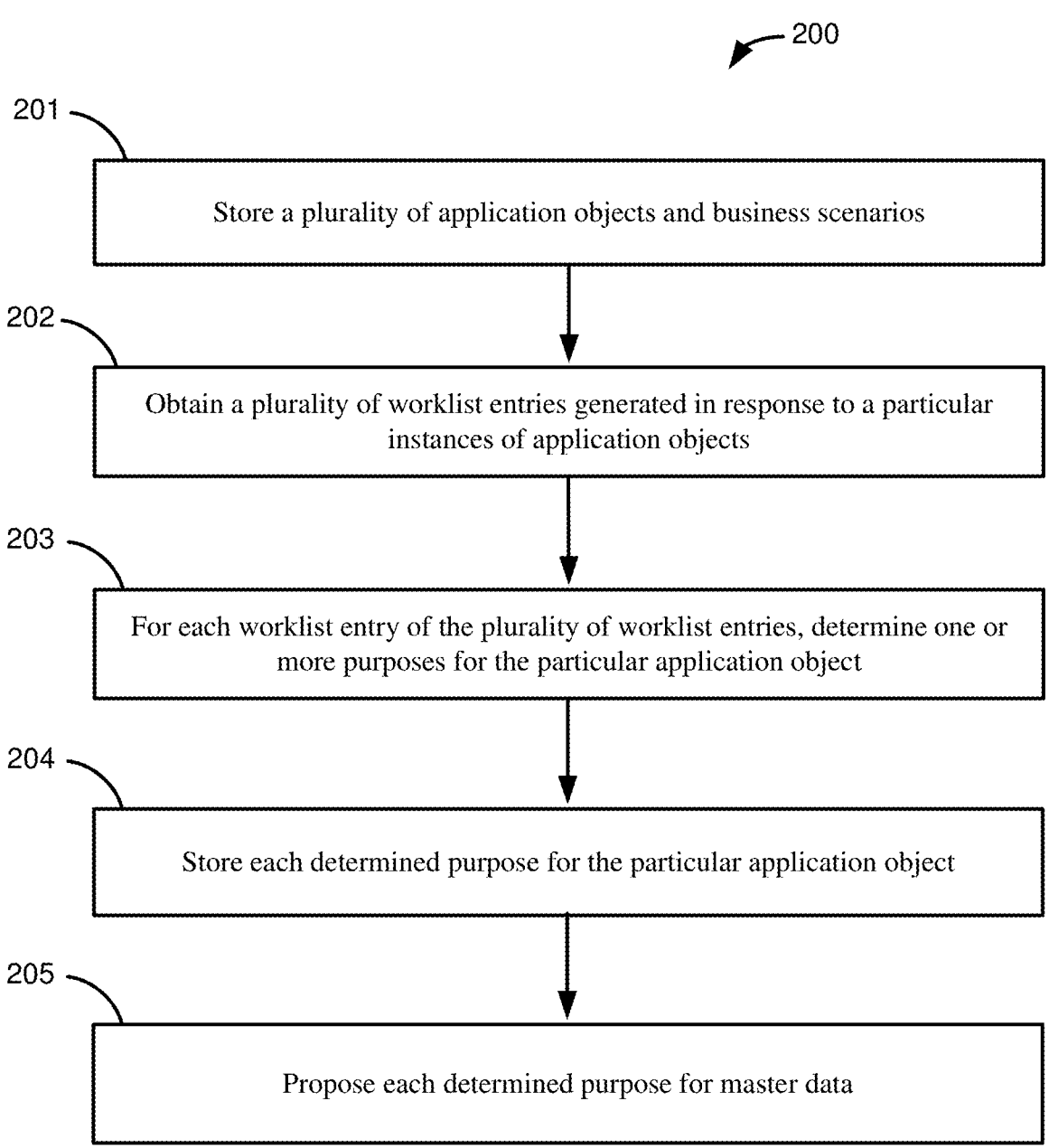

200

201

Store a plurality of application objects and business scenarios

202

Obtain a plurality of worklist entries generated in response to a particular instances of application objects

203

For each worklist entry of the plurality of worklist entries, determine one or more purposes for the particular application object

204

Store each determined purpose for the particular application object

205

Propose each determined purpose for master data

*FIG. 2*

CENTRAL DATA PROTECTION AND PRIVACY FRAMEWORK

BACKGROUND

The present disclosure relates to data protection and privacy and in particular to a central framework for end-to-end data protection and privacy processing.

Data protection and privacy (DPP) refers to the privacy and protection of personal data (e.g., the data of a natural person). Personal data is used in many software applications for various purposes. However, because such information is sensitive, many countries have laws related to DPP, which may define what data can be stored, how it may be used, and for what purposes. For example, Europe has General Data Protection Regulation (GDPR) and the US has the Health Insurance Portability and Accountability Act (HIPPA). Under the DPP laws, each person has various rights. For example, people have the right to have their information forgotten after the legal retention duration is over. They also have a right to request a report of their data and the purposes for which the data was or is being used.

Implementing data protection and privacy in computer and software systems to ensure compliance with various laws can involve implementing policies to restrict access to data, maintaining the data over various legal retention periods, and performing deletion of the data after the retention periods are over. In the DPP domain, there are many entities and frameworks like Information Lifecycle Management (ILM) objects, destruction objects, information retrieval framework (IRF) objects, purposes, data controllers, data categories, and others, each with their own usage catering to one or more of the DPP compliance requirements. In the business domain, there are many entities like Business data objects, RESTful Application Programming (RAP) Objects, archiving objects, and others, each with their own usage related to application areas like business partners master data, opportunities, sales orders, purchase orders, billing, invoices, contracts, etc.

These entities have evolved over decades of development with point-to-point mappings (if at all a mapping is established) between one of the DPP entities and one of the Business entities, which may be burdensome and cost-intensive as they require area specific skillsets and separate consultants for each area. Furthermore there is a lot of complexity in setting up these processes with huge manual efforts. And while certain software applications or platforms enable users to add more entities or enhance the semantics of the existing entities (e.g., for customer or industry-specific extensibility reasons), this is done in an uncontrolled manner. Prior systems had no end-to-end processing which would unify the entities across the business and DPP domains for better control and management.

The present disclosure addresses these issue and others, as further described below.

SUMMARY

Some embodiments provide a computer system comprising one or more processors and one or more machine-readable medium coupled to the one or more processors and storing computer program code comprising sets of instructions executable by the one or more processors. The instructions executable to store a plurality of application objects and business scenarios, each application object linked to a particular data category of a plurality of data categories, linked with a name of a corresponding data object, and linked with primary key attributes of the corresponding data object, wherein each particular data category is linked to a purpose of a plurality of purposes, wherein each business scenario includes a set of application objects and a sequence for the set of application objects. The instructions executable to obtain a plurality of worklist entries generated in response to a particular instances of application objects for a plurality of different applications being created or modified. The instructions executable to for each worklist entry of the plurality of worklist entries, determine a particular one or more purposes for the particular application object of the worklist entry using purpose assignment rules for the particular application object. The instructions executable to store each of the one or more determined purposes for the particular application object in a purpose assignment table. The instructions executable to propose each determined purpose for master data to be used across the plurality of different applications.

Some embodiments provide one or more non-transitory computer-readable medium storing computer program code comprising sets of instructions. The computer program code comprising sets of instructions to store a plurality of application objects and business scenarios, each application object linked to a particular data category of a plurality of data categories, linked with a name of a corresponding data object, and linked with primary key attributes of the corresponding data object, wherein each particular data category is linked to a purpose of a plurality of purposes, wherein each business scenario includes a set of application objects and a sequence for the set of application objects. The computer program code comprising sets of instructions to obtain a plurality of worklist entries generated in response to a particular instances of application objects for a plurality of different applications being created or modified. The computer program code comprising sets of instructions to, for each worklist entry of the plurality of worklist entries, determine one or more purposes for the particular application object of the worklist entry using purpose assignment rules for the particular application object. The computer program code comprising sets of instructions to store each of the one or more determined purposes for the particular application object in a purpose assignment table. The computer program code comprising sets of instructions to propose each determined purpose for master data to be used across the plurality of different applications.

Some embodiments provide a computer-implemented method. The method comprises storing a plurality of application objects and business scenarios, each application object linked to a particular data category of a plurality of data categories, linked with a name of a corresponding data object, and linked with primary key attributes of the corresponding data object, wherein each particular data category is linked to a purpose of a plurality of purposes, wherein each business scenario includes a set of application objects and a sequence for the set of application objects. The method further comprises obtaining a plurality of worklist entries generated in response to a particular instances of application objects for a plurality of different applications being created or modified. The method further comprises, for each worklist entry of the plurality of worklist entries, determining one or more purposes for the particular application object of the worklist entry using purpose assignment rules for the particular application object. The method further comprises storing each of the one or more determined purposes for the particular application object in a purpose assignment table.

The method further comprises proposing each determined purpose for master data to be used across the plurality of different applications.

BRIEF DESCRIPTION OF THE DRAWINGS

FIG. 2 shows a flowchart of method for determining DPP purposes, according to an embodiment.

DETAILED DESCRIPTION

Figure 1:
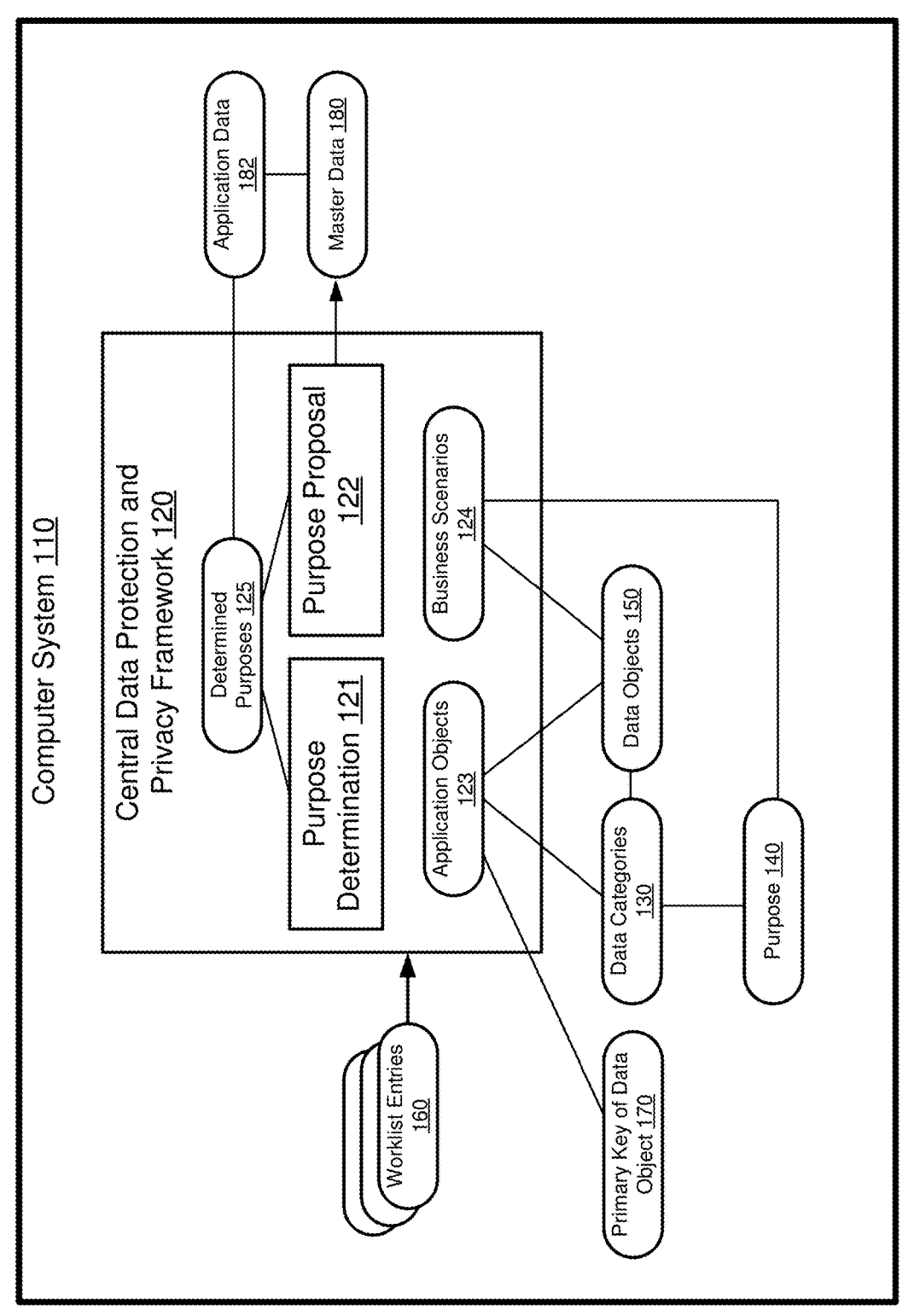
FIG. 1 shows a diagram of a computer system including a central data protection and privacy (DPP) framework, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated and may instead be used for differentiation between different objects or elements.

As mentioned above, entities in the data protection and privacy (DPP) domain and the business domain have evolved over decades of development with point-to-point mappings (if at all a mapping is established) between one of the DPP entities and one of the Business entities, which may be burdensome and cost-intensive as they require area specific skillsets and separate consultants for each area. Furthermore there is a lot of complexity in setting up these processes with huge manual efforts. And while certain software applications or platforms enable users to add more entities or enhance the semantics of the existing entities (e.g., for customer or industry-specific extensibility reasons), this is done in an uncontrolled manner. Prior systems had no end-to-end processing which would unify the entities across the business and DPP domains for better control and management.

Furthermore, certain modern software systems and platforms are focusing on end-to-end business processes. Accordingly, it is all the more pertinent that DPP tools provide compliance wholistically and in a simplified manner. For example, purpose-based processing across all the applications along with the assignments of purposes to master data consumed across applications can be done in a unified and simplified manner. Furthermore, other DPP processes like information retrieval, blocking and deletion, etc. can also follow an end-to-end approach across all applications.

To address these issues and others the present disclosure provides a central DPP framework that unifies and manages DPP and business entities for end-to-end DPP processing. The DPP central framework includes design time objects including Application Objects (AO) and Business Scenarios with supporting application programming interfaces (APIs).

An overview of the central DPP framework and its use in determining purposes for which data is used is described below with respect to FIG. 1. A method for determining purposes is described below with respect to FIG. 3. And an example implementation of the central DDP framework is described below with respect to FIGS. 3-9. Example computer hardware usable for implementing the central DPP framework is described below with respect to FIG. 10.

FIG. 1 shows a diagram 100 of a computer system 110 including a central data protection and privacy (DPP) framework 120, according to an embodiment. The central DPP framework 120 includes a purpose determination software component 121 and a purpose proposal software component 122. The computer system 110 may include one or more computer servers and databases. The computer system 110 may operate on a cloud platform or in an on-premise environment, for example.

The central DPP framework 120 stores a plurality of application objects 123 and business scenarios 124. Each application object 123 may be linked to a particular data category of a plurality of data categories 130. Each application object 123 may also be linked with a name of a data object 150. And each application object 123 may be linked with primary key attributes of the data object 170. Each particular data category 130 may be linked to a purpose of a plurality of purposes 140. Each business scenario 124 may include a set of data objects 150 and a sequence for the set of data objects. Some examples of data objects are business objects. Business objects represent transactions of a business, such as sales orders, delivery documents, billing documents, invoices, etc. In certain implementations and embodiments "data objects" may be implemented as a "business data objects." Accordingly, in some implementations the terms "business data objects" and "data objects" may be used interchangeably. In other embodiments the data objects may be of different types.

In some embodiments the business scenario 124 is hierarchical and includes a primary scenario and one or more sub-scenarios. In some embodiments, the application object 123 links a data object 150 and an Information Lifecycle Management (ILM) object, the ILM object indicating a retention and residence period to the business data object. In some embodiments, the data category 130 is representative of different categories of data sets within the master data 180 and the application data 182. The master data 180 may be used across multiple different documents or applications. The application data 182 is data used by particular documents or applications. The determined purposes 125 are the purposes for which the application data 182 may be used. As examples, sales is a purpose and consent to receiving marketing emails is another purpose for which application data 182 may be used. These determined purposes 125 may optionally also be linked to business scenarios 124.

The central DPP framework 120 may obtain a plurality of worklist entries 160 generated in response to a particular instances of application objects 123 for a plurality of different application instances being created or modified.

For each worklist entry of the plurality of worklist entries, the purpose determination component 121 of the central DPP framework 120 may determine purposes 140 for the particular application object 123 of the worklist entry 160 using purpose assignment rules for the particular application object. In some embodiments, the purpose assignment rules are based on a link between a business scenario 124 and a particular purpose 140.

The central DPP framework 120 may store each determined purpose 125 in a purpose assignment table belonging to each application.

The purpose proposal component 122 of the central DPP framework 120 may propose each determined purpose for master data to be used across the plurality of different applications. In some embodiments, the determined purposes proposed for the master data are integrated into the master data and are used across the plurality of different applications.

The central DPP framework 120 and its features, advantages, and use cases are described in further detail below.

FIG. 2 shows a flowchart of method for determining DPP purposes, according to an embodiment. The method of FIG. 2 may be implemented by a computer system such as the one described above with respect to FIG. 1.

At 201, the method may store a plurality of application objects and business scenarios. Each application object may be linked to a particular data category of a plurality of data categories. Each application object may be linked with a name of a corresponding data object. And each application object may be linked with primary key attributes of the corresponding data object. Each particular data category may be linked to a purpose of a plurality of purposes. Each business scenario may include a set of application objects and a sequence for the set of application objects.

In some embodiments, the business scenario maps to multiple data objects in a specific sequence. In some embodiments the business scenario is hierarchical and includes a primary scenario and one or more sub-scenarios. In some embodiments, the application object links a data object and a lifecycle management object, the lifecycle management object indicating a retention period. In some embodiments, the data category is representative of different categories of data sets within the master data.

At 202, the method may obtain a plurality of worklist entries generated in response to a particular instances of application objects for a plurality of different application instances being created or modified.

At 203, for each worklist entry of the plurality of worklist entries, the method may determine one or more purposes for the particular application object of the worklist entry using purpose assignment rules for the particular application object. In some embodiments, the purpose assignment rules are based on a link between a business scenario and a particular purpose.

At 204, the method may store each of the one or more determined purposes in a purpose assignment table. Each determined purpose may be stored after it has been determined without waiting for other purposes to be determined at 203 first. That is, for an Application instance, all the determined purposes are stored together. Across application instances or across application objects, no dependencies exist between determination and storage.

At 205, the method may propose each determined purpose for master data to be used across the plurality of different applications. In some embodiments, the determined purposes proposed for the master data are integrated into the master data and are used across the plurality of different applications.

Example Embodiments

Figure 3:
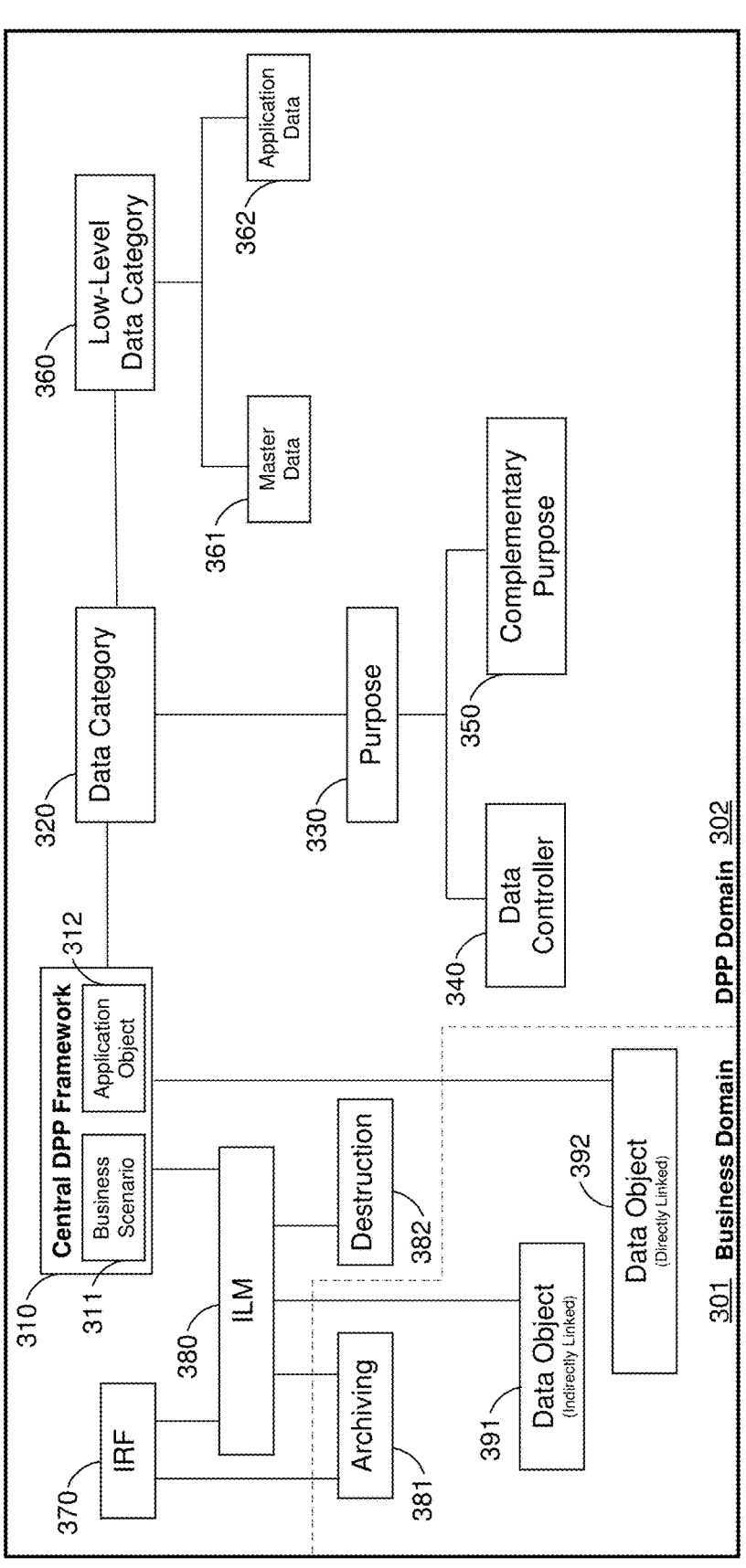
FIG. 3 shows a diagram of business and DPP domains including the central DPP framework, according to an embodiment.

FIG. 3 shows a diagram 300 of a business domain 301 and a DPP domain 302 including a central DPP framework 310, according to an embodiment. The business domain 301 and the DPP domain 302 are domains within a software system or platform including a plurality of software applications. The software may be implemented on a cloud platform or it may be implemented on-premise, for example. The central DPP framework 310 unifies and manages all entities in the DPP domain 302 and the business domain 301 for end-to-end DPP processing.

The central DPP framework 310 includes design time objects including Application Objects 312 (AO) and Business Scenarios 311 with supporting APIs. Application objects map to an application in the DPP domain 302. Application objects unify the Business and DPP entities together. On the Business domain 301, application objects 312 are linked with Name and Primary key attributes of data objects either directly (as with data object 392) or indirectly via an Information life cycle management (ILM) 380 application (as with data object 391). Every software application of the software system may use a particular data object 391, 392, such as a sales order, a purchase order, a delivery document, or a billing document, for example.

ILM 380 manages the data objects 391, 392 to ensure that data is present in the systems up to a certain duration referred to as the legal retention period. For example, the ILM 380 framework may wrap around the data object to ensure destruction 382 compliance, including deletion when the duration/period is over and deletion-blocking of the data based on different ILM policies or durations that can be defined on top of the data. The ILM 380 framework may also provide archiving 381 of data objects, including archiving for a duration of a corresponding retention period. The Information Retrieval Framework (IRF) 370 provides for retrieving archived data objects.

Figure 4:
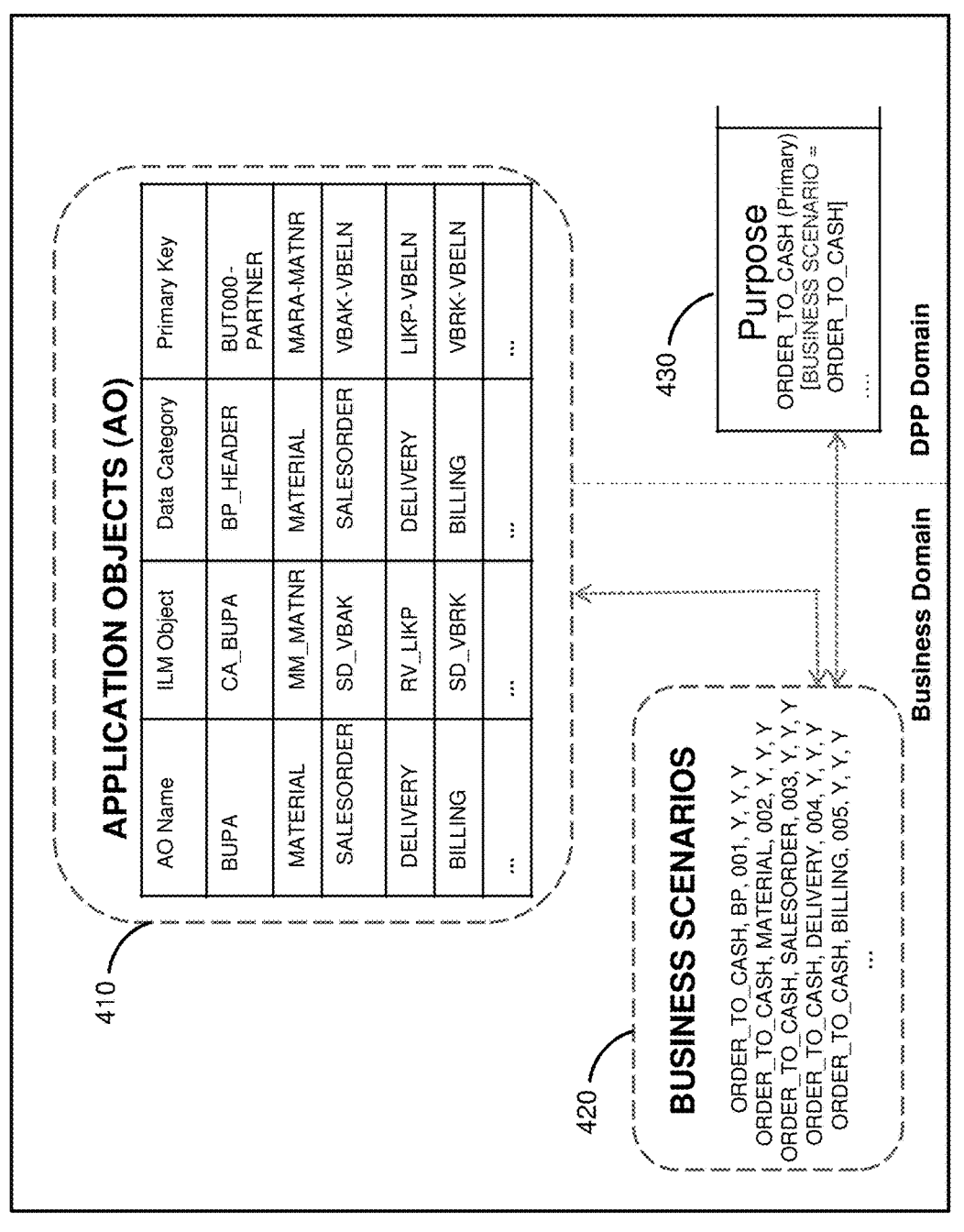
FIG. 4 shows a diagram of examples of an application object, business scenario, and purpose according to an embodiment.

An application specific structure of primary key attributes of data objects (unique per application) is maintained in an AO 312 to unify the differences across applications. Without this, a separate table would be needed per application representing its unique key in various storages. Using this, an application just needs to represent its unique key behind a structure and register this structure in the AO 312. Furthermore, during the purpose determination, this registered structure is resolved into the exact attributes for any application-specific processing. For example, a "SALESORDER" application object has "ORDER_NO" as Key attribute in its structure, a "MATERIAL" application object has "MATNR" as a Key attribute in its structure, and a "Z_CUSTOMAPP" application object has "[ATTRIBUTE1, ATTRIBUTE2]" as a composite key in its structure. These are examples of structures which are maintained in an application object 312. Application objects 312 are further described below and an example is shown in FIG. 4.

On the DPP domain 302, application objects 312 are linked directly to Data Category 320 (representative of low-level data category 360 data sets within Master data 361 and/or application data 362) and transitively to Purposes 330, Complementary Purposes 350, and Data Controllers 340.

The application data 362 is data used and stored by a software application.

The master data 361 is used across applications. For example, an online shopping application may create a "business partner" which has footprints in sales orders, invoices, return orders, and various different applications. When this business partner is blocked and subsequently deleted, it should be based on the consumption of the business partner across all of the applications. That is, the retention periods (specific to an application indicated in its ILM object) should be checked across all applications.

The data controllers 340 are the owners of the data, which are specific to different legal entities. For example, a country, a state within a country, or another entity which can have different laws for processing different sets of application documents. The data controller 340 is a representation of the legal entity.

The purpose 330 is the actual business purpose based on which the data processing needs to be done. For example, if a shopping application may create a record for the purpose of "sales." Another purpose could be "consent to receive marketing emails", for example. Different sets of purposes 330 could be attached to data, which is handled as part of the purpose 330 and "complementary purpose" 350 hierarchy. The word complementary may interchangeably be used with "additional".

The data category 320 refers to different data sets or types within the complete data. For instance, some data sets needs to be protected more than the others. For example, bank specific information or credit card information (which are examples of different data categories) may need more protection than first/last name information (which is another example of a data category). The data category and purpose are used to determine the data protection and privacy/access/visibility settings, and so forth. An example of purpose-based processing is described below and with respect to FIG. 9.

Application objects 312 are advantageous for their use in purpose-based processing. For example, application objects can be used in a purpose determination framework (discussed below), or to automatically determine the Purposes for Applications (represented by AOs), or to proposes the purposes for BP Master data which is consumed across AOs. Other use areas include information retrieval, blocking and deletion, and so on.

Business scenarios 311 are technical measures to define end-to-end scenarios such as Lead To Cash, Total Workforce Management, Procure To Pay, Hire To Retire, and other scenarios implemented by the software system and applications. Business scenarios 311 are an abstraction over AOs 312 in the business domain 301 enabling DPP processing (e.g., Information Retrieval Framework 370, Destruction 382, Blocking and Deletion, etc.) in an end-to-end manner per application.

Standard scenarios can be delivered (as Inactive) as part of the software system. Furthermore, users of the central DPP framework 310 may also create custom scenarios.

A scenario can map to multiple data objects 391, 392 in a specific sequence. One data object can be in many scenarios. For example, an "ORDER_TO_CASH" business scenario can map to a "SALESORDER" object, a "MATERIAL" object, or a "BUSINESS_PARTNER" object, for example.

Business scenarios 311 can have hierarchy. That is, there can be a primary scenario with sub-scenarios. For example, "LEAD_TO_CASH" can be a primary scenario with sub-scenarios like "CONTACT_TO_LEAD", "LEAD_TO_OPPORTUNITY", "OPPORTUNITY_TO_QUOTE", "QUOTE_TO_ORDER", and "ORDER_TO_CASH", for example. In some cases the sub-scenarios can be implicit, meaning they would be automatically used along with the primary scenario.

Figure 5:
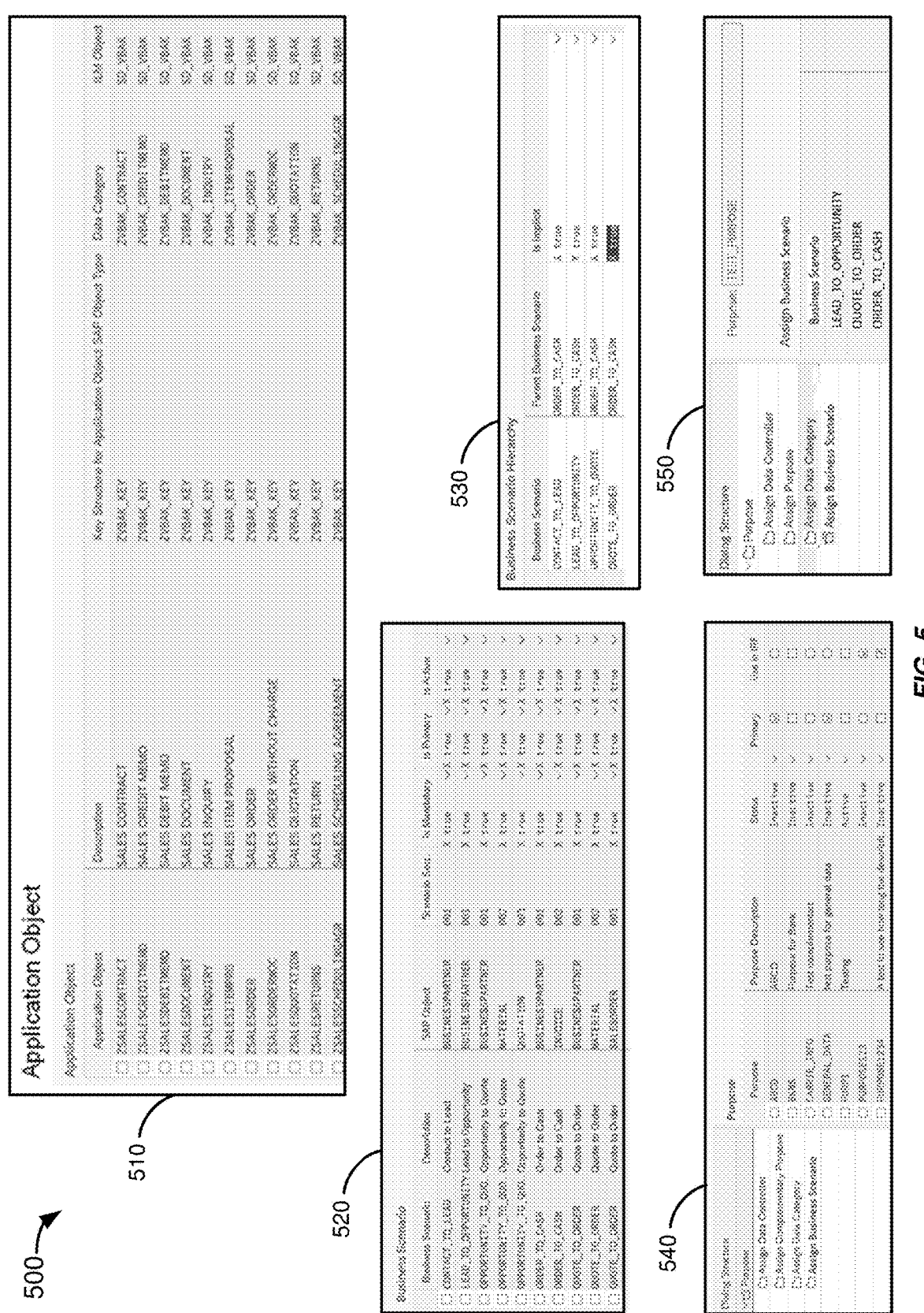
FIG. 5 shows an illustration of example user interface screens for configuring application objects and business scenarios, according to an embodiment.

The business scenarios 311 can be assigned to purposes 330. For instance, scenarios 311 may be automatically linked to a purpose 330 based on linking of data objects 391, 392 in application object 312 mappings. A user may select the desired linked business scenario 311 in purpose 330 and activate. An example user interface showing inactive/active status of business scenarios assigned to purposes are shown in FIG. 5. This assignment enables end-to-end purpose-based DPP processing.

In some embodiments the use of business scenarios 311 may be optional. The usage of business scenarios 311 may simplify overall compliance by linking the Scenarios 311 (instead of linking fine granular Aos 312) to Purpose 330 and performing DPP activities on a collection of objects in sequence.

Application objects 312 and business scenarios 311 enable the central DPP framework 310 to bind entities across the domains 301, 302 so that they can be used for end-to-end processing. As an example of the advantages of the central DPP framework, consider a situation where a user requests all of their personal information stored by the system (as they have the right to do under certain DPP laws). Certain prior systems without a central DPP framework 310 may provide multiple separate reports, such as a report for invoices of the user, a report for sales orders of the user, a report of pricing orders of the user, and so on. The central DPP framework 310 is advantageous as it supports end-to-end processing and can give a complete report that spans the entire process, such as a sales-to-cash process which may involve a sales process, a billing process, an invoicing process, and a return order process, from end to end.

Application objects 312 and business scenarios 311 are further described below along with examples.

FIG. 4 shows a diagram 400 of an example application object 410, business scenario 420, and purpose 430 according to an embodiment. As discussed above, the central data protection and privacy framework includes application objects and business scenarios. The application objects (AO) have mapping entities that can be called with the following fields: ILM object and Data Category in In the DPP domain and Name & Primary key attributes of data objects in the business domain, for example.

Business Scenarios map to multiple data objects in a specific sequence. In some cases a business scenario can be a primary scenario with sub-scenarios. The business scenarios can be mapped (e.g., assigned) to a purpose such that when the scenario is activated, the purpose can be used across various DPP tools and applications. The business scenario can include a scenario identifier, data objects, an indicator of whether the scenario is mandatory (as a sub-scenario), an object sequence, a flag to represent whether this scenario is a complete end-to-end SAP Business scenario or a sub-business scenario, an indicator whether this scenario is Active for customer consumption.

In this example, the applications objects 312 have an AO Name and are mapped to an ILM object, a data category, and a primary key, as shown in the following table, which is accessible via an API.

| AO Name | ILM Object | Data Category | Primary Key |
|---|---|---|---|
| BUPA | CA_BUPA | BP_HEADER | BUT000-PARTNER |
| MATERIAL | MM_MATNR | MATERIAL | MARA-MATNR |
| SALESORDER | SD_VBAK | SALESORDER | VBAK-VBELN |
| DELIVERY | RV_LIKP | DELIVERY | LIKP-VBELN |
| BILLING | SD_VBRK | BILLING | VBRK-VBELN |

In this example the business scenarios 420 include the following scenarios (scenario ID, data object, mandatory identifier, and object sequence):

| Scenario ID | Data object | Object sequence | Mandatory identifier | Is Primary | Is Active |
|---|---|---|---|---|---|
| ORDER_TO_CASH | BP | 001 | Y | Y | Y |
| ORDER_TO_CASH | MATERIAL | 002 | Y | Y | Y |
| ORDER_TO_CASH | SALESORDER | 003 | Y | Y | Y |
| ORDER_TO_CASH | DELIVERY | 004 | Y | Y | Y |
| ORDER_TO_CAS | BILLING | 005 | Y | Y | Y |

In this example, the purpose includes an "ORDER_TO_CASH" name of the purpose, and it is assigned to the business scenario "ORDER_TO_CASH." This assignment is creating a "bucket" for all of the application data objects (e.g., BP, materials, sales order, delivery, and billing all together). When this purpose is used by any of the existing DPP framework, like the deletion and blocking framework, the information retrieval framework, or other frameworks, the system does not need to be set up at a drilled down level into these different application data objects. Instead, a feature and advantages of the central DPP framework is that purpose-based processing can be done at a higher level. That is, the business scenario level. Thereby avoiding manual efforts in creating and maintaining point to point connections as would be required without the central DPP framework. Example user interfaces showing application objects and business scenarios given in FIG. 5 and are described below.

FIG. 5 shows an illustration 500 of example user interface screens, according to an embodiment. The user interfaces include an interface for configuring application objects 510, an interface showing the business scenarios 520, an interface showing the business scenario hierarchy 530, and an interface showing purposes 540, and a user interface showing assignment to business scenario, according to an embodiment.

The user interface 510 showing application objects shows the application object identifier, a description of the application object, the key structure for the application object type, the data category, and the ILM object. For example, the first application object in the table shown in the user interface 510 is "ZSALESCONTRACT" having a description of "SALES CONTRACT." The key structure for this AO is "ZVBAK_KEY", the data category is "ZVBAK_CONTRACT", and the ILM object is "SD_VBAK." This application object is just an example. Other examples are shown in the UI 510.

The user interface 520 shows the business scenarios. For example, the first business scenario in the table is "CONTACT_TO_LEAD", which has the description "Contact to Lead," the object "BUSINESSPARTNER," the scenario sequence of "001," a mandatory indicator (Is Mandatory) of "true," a primary indicator (Is Primary) of "true," and an active indicator (Is Active) of "true."

As another example, the second business scenario in the table is "LEAD_TO_OPPORTUNITY," with the description "Lead to Opportunity," the object "BUSINESS PARTNER," the scenario sequence of "001," a mandatory indicator (Is Mandatory) of "true," a primary indicator (Is Primary) of "true," and an active indicator (Is Active) of "true."

The user interface 530 shows a business scenario hierarchy. In this example, each of the business scenarios "CONTACT_TO_LEAD," "LEAD_TO_OPPORTUNITY," "OPPORTUNITY_TO_QUOTE," AND "QUOTE_TO_ORDER" each have "ORDER_TO_CASH" as their parent business scenario. Furthermore, each of these scenarios has an implicit indicator (Is Implicit) that is "true."

The user interface 540 shows how the purpose is extended with scenario assignments. The purpose includes an identifier or name of the purpose, a purpose description, a status, a primary indicator, and a user in IRF indicator. For example, the first purpose listed in the table shown in the user interface 520 is "ABCD" which has a description of "ABCD", a status of "Inactive" (as opposed to "Active"), a checked box indicating that it is a primary purpose (as opposed to a "complementary purpose"), and an unchecked box indicated that it is not used in IRF. As a second example, the second purpose shown in the user interface 520 is "BKNS," which has a description of "Purpose for Bank," an "Inactive" status, an unchecked box indicating that it is not a primary purpose, and a checked box indicating that it is not used in IRF.

The user interface 550 shows assignment of business scenarios for the purpose "TEST_PURPOSE." In this example, the "LEAD_TO_OPPORTUNITY," "QUOTE_TO_ORDER," AND "ORDER_TO_CASH" business scenarios are assigned to the purpose "TEST_PURPOSE."

Object database diagrams for the application object, business scenario, and purpose assignment are given in FIGS. 6-8 and described below.

Figure 6:
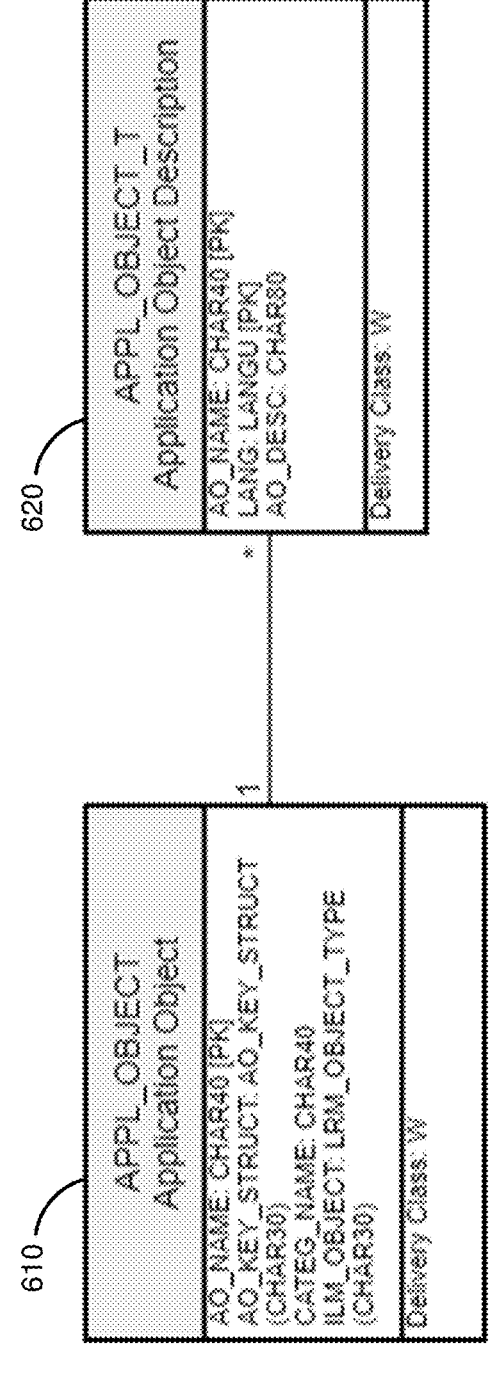
FIG. 6 shows an application object database diagram, according to an embodiment.

FIG. 6 shows an application object database diagram 600, according to an embodiment. The diagram 600 includes an Application Object (APPL_OBJECT) and an Application Object Description (APPL_OBJECT_T), where there is a one to many relationship between an application object and the application object description (per language).

The application object includes an application object name (AO_NAME), an AO key structure (AO_KEY_STRUCT) which represents name and primary key attributes of data objects, a data category name (CATEG_NAME), and an ILM object (ILM_OBJECT).

The application object description includes an application object name (AO_NAME), a language (LANG) (e.g., based on the user logged-in language in the user interface, an appropriate language test is selected), and an application object description (AO_DESC).

Figure 7:
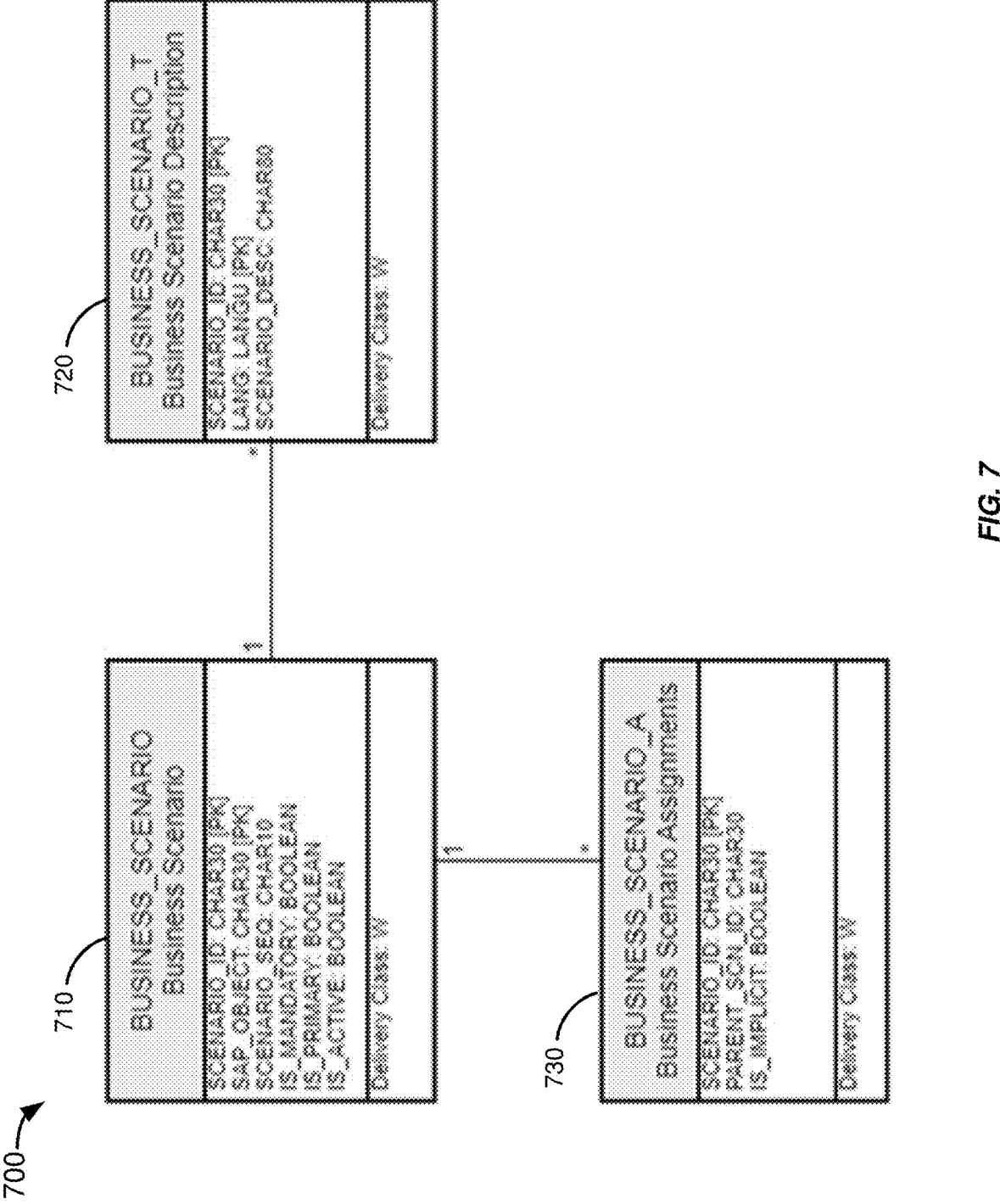
FIG. 7 shows a business scenario object database diagram, according to an embodiment.

FIG. 7 shows a business scenario object database diagram 700, according to an embodiment. The diagram 700 includes a Business Scenario 710, a Business Scenario Description 720, and Business Scenario Assignments 730. There is a one to many relationship between the business scenario 710 and the business scenario description 720. There is also a one to many relationship between the business scenario 710 and the business scenario assignments 730.

The Business Scenario 710 includes SCENARIO_ID, BUSINESS_DATA_OBJECT, SCENARIO_SEQ, IS_MANDATORY, IS_PRIMARY, and IS_ACTIVE.

SCENARIO_ID denotes a Business Scenario. These are technical measures to define end-to-end Business scenarios like Lead To Cash, Total Workforce Management, Procure To Pay, Hire To Retire etc.

BUSINESS_DATA_OBJECT represents one of the many data objects in the Business Scenario.

SCENARIO_SEQ represents the sequence of how the data object would be placed in end-to-end business scenario.

IS_MANDATORY is a flag to indicate that the business scenario is mandatory to be included as a sub-scenario.

IS_PRIMARY is a flag to represent a complete end-to-end SAP Business scenario. There can be sub-business scenarios for this.

IS_ACTIVE is an indicator is whether the Business Scenario is Active for customer consumption. The user has flexibility to activate a preexisting scenario or to create their own business scenario.

The Business Scenario Description 720 includes the SCE-NARIO_ID, LANG, and SCENARIO_DESC. The SCE-NARIO_DESC is a description of the business scenario.

SCENARIO_ID is an identifier of the business scenario.

LANG is a language for the business scenario.

SCENARIO_DESC is a description of the business scenario.

The Business Scenario Assignments 730 includes SCE-NARIO_ID, PARENT_SCN_ID, and IS_IMPLICIT.

SCENARIO_ID is an identifier of the business scenario assignment.

PARENT_SCN_ID is a parent business scenario to represent hierarchy of Business Scenarios. Two examples follow:

```
    SCENARIO_ID=LEAD_TO_QUOTE,
        PARENT_SCN_ID=LEAD_TO_CASH

SCENARIO_ID=ORDER_TO_CASH,
        PARENT_SCN_ID=LEAD_TO_CASH
```

IS_IMPLICIT is a flag where whenever a business scenario is used, its sub-business scenarios are also automatically chosen (when the IS_IMPLICIT flag set) for any processing.

Figure 8:
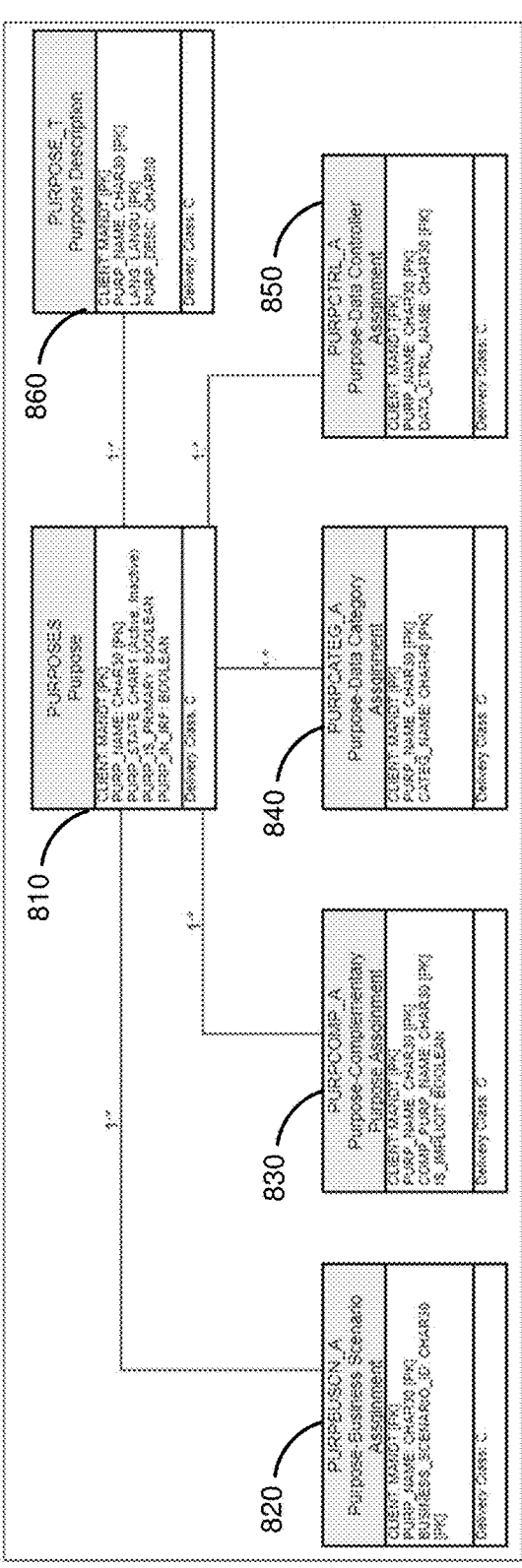
FIG. 8 shows a purpose assignment to business scenario object database diagram, according to an embodiment.

FIG. 8 shows a purpose assignment to business scenario object database diagram 800, according to an embodiment.

Diagram 800 includes Purposes (PURPOSES) 810, which has a 1 to many relationship with each of Purpose-Business Scenario Assignment (PURPBUSCN_A) 820, Purpose-Complementary Purpose Assignment (PURPCOMP_A) 830, Purpose-Data Category Assignment (PURPCATEG_A) 840, Purpose-Data Controller Assignment (PURPCTRL_A) 850, and Purpose Description (PURPOSE_T) 860.

The Purposes (PURPOSES) 810 includes a client, a purpose name, a purpose state (active or inactive), a primary indicator, and an IRF indicator. The "client" may reference when an installation is segregated into different clients/tenants.

The Purpose-Business Scenario Assignment (PURPBUS-CN_A) 820 includes a client, a purpose name, and a business scenario identifier.

The Purpose-Complementary Purpose Assignment (PURPCOMP_A) 830 includes a client, a complementary purpose name, and an "is implicit" identifier.

The Purpose-Data Category Assignment (PURPCAT-EG_A) 840 includes a client, a purpose name, and a category name.

The Purpose-Data Controller Assignment (PURPC-TRL_A) 850 includes a client, a purpose name, and a data controller name.

The Purpose Description (PURPOSE_T) 860 includes a client, purpose name, lang, and purpose description.

The central DPP framework provides various APIs for application objects, business scenarios, and purposes.

For application objects, the APIs include:

```
GET_DETAILS
GET_DATA_CATEGORY_FOR_AO /
GET_AO_FOR_DATA_CATEGORY
GET_SAPOBJECT_FOR_AO / GET_AO_FOR_SAPOBJECT
GET_ILMOBJECT_FOR_AO / GET_AO_FOR_ILMOBJECT
GET_PRIMARYKEY_FOR_AO
```

For business scenarios, the APIs include:

```
GET_PRIMARY_BUSINESS_SCENARIO
GET_SUB_BUSINESS_SCENARIO
GET_SAPOBJECT_FOR_BUSINESS_SCENARIO
GET_BUSINESS_SCENARIO_FOR_SAPOBJECT
```

For purposes, the APIs include:

```
GET_BUSINESS_SCENARIO_FOR_PURPOSE
GET_PURPOSE_FOR_BUSINESS_SCENARIO
```

The central DPP framework described above can be used in a variety of use cases. Examples of such use cases include purpose determination, adding or modifying entities to the central DPP framework, a purpose agent to determine purposes of business applications using rules and for determining the purposes of master data used across applications, blocking and subsequent deletion of personal data, and information retrieval per purpose reports. Details of the purpose determination use case are described below with respect to FIG. 9.

Figure 9:
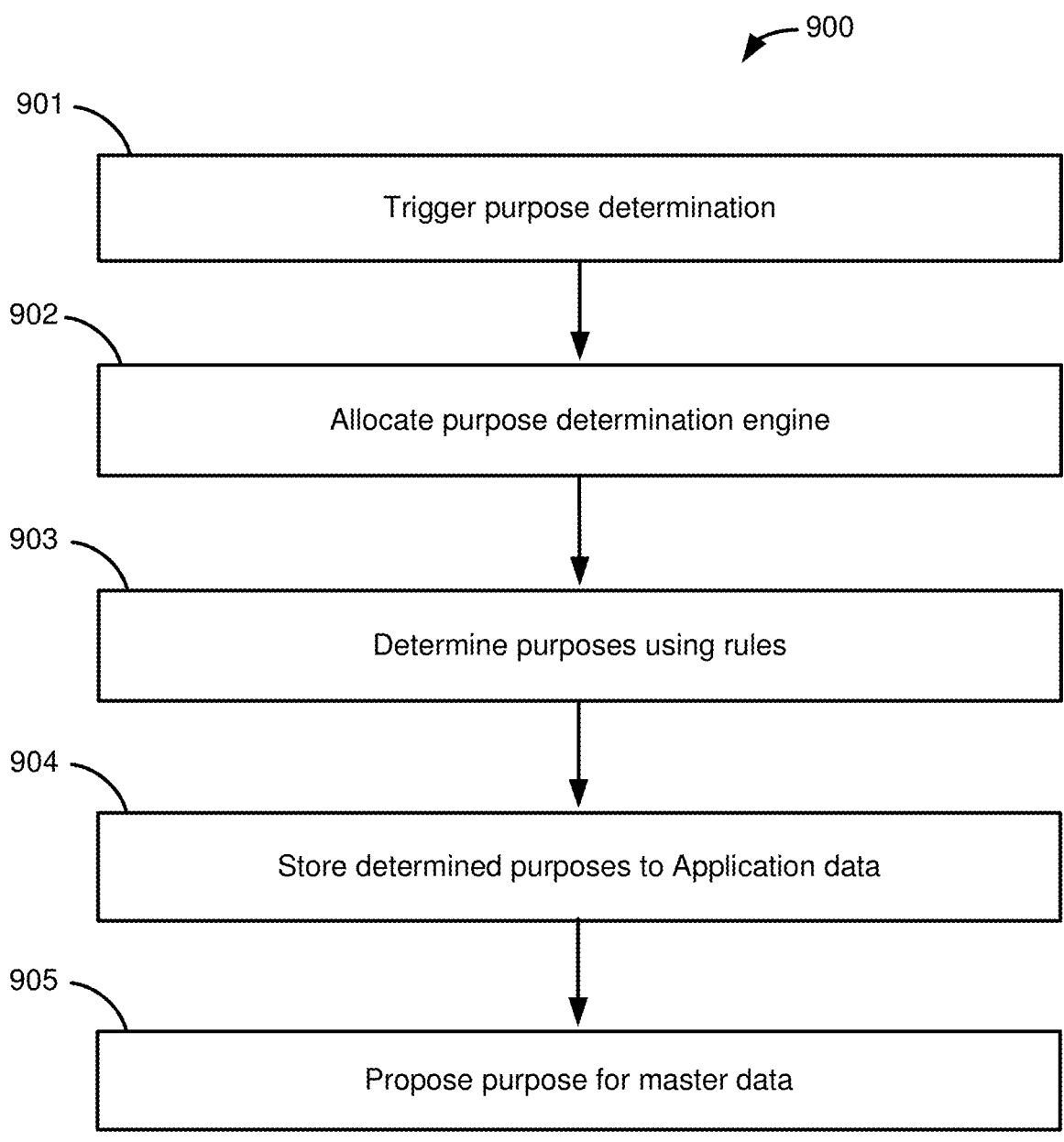
FIG. 9 shows a flowchart of a method for determining purposes, according to an embodiment.

FIG. 9 shows a flowchart 900 of a method for determining purposes, according to an embodiment. The purpose determination framework automatically determines the purposes for Applications (represented by AOs) and proposes the purposes for master data which is consumed across AOs. The determination is based on the rules defined in the central DPP customizing framework. To do this the applications include AO entries for the application, an application registry that registers the application for purpose determination using the AO, AO specific classes to provide application-level inputs for the purpose determination logic, and purpose assignment tables (per AO) where the determined purposes are stored after they are determined. In addition, a user may activate an AO for purpose determination.

An overview of purpose determination is now given using the flowchart 900.

At 901, trigger purpose determination. The purpose determination trigger is created by an application for an AO instance SAVE. That is, saving (or creating) an AO instance triggers purpose determination, which can be handled using a worklist entry. For example, purpose determination can be initiated using a call that includes the AO name and key information. Then the central DPP framework can determine if purpose determination is activated for that AO. If it is, then a worklist entry can be created with a "NEW" status.

At 902, allocate purpose determination engine. A Purpose Determination Job can pick up worklist entries and allocate them to a Purpose Determination Engine. For example, new worklist entries can be periodically picked up (e.g., when the worklist contains at least a predetermined number of new entries). Then the technical jobs run and purpose determination is performed. [[Would it be possible to add more details from slide 19? It's unclear to me what happens with Technical Job, Process Worklist, Fetch, Loop, etc.]].

At 903, determine purposes using rules. The Purpose Determination Engine determines Purposes using rules from the Central Purpose customizing for all the activated AOs. A Rule engine can also be integrated. An AO specific Class can provide AO instance details and any predecessor (dependent) AO.

In some embodiments a Business Scenario can be used in Purpose determination. Instead of configuring the functionality per AO, it can be setup for the complete Business Scenario. Purpose determined can be performed for all the underlying data objects (and their corresponding AOs). The purposes may be determined while considering the dependencies (or predecessors) in the sequence of business data objects within a Business Scenario.

At 904, store determined purposes. The determined purposes can be stored in application specific purpose assignment tables. As an example, an application specific table may include the information in the following table. This table is an example and information in a purpose assignment table may be specific to a particular implementation.

sales" and "Pediatrics_sales", these 2 purposes will be stored in the Sales AO Purpose Assignment table and also proposed to BP "XYZ".

Example Hardware

Figure 10:
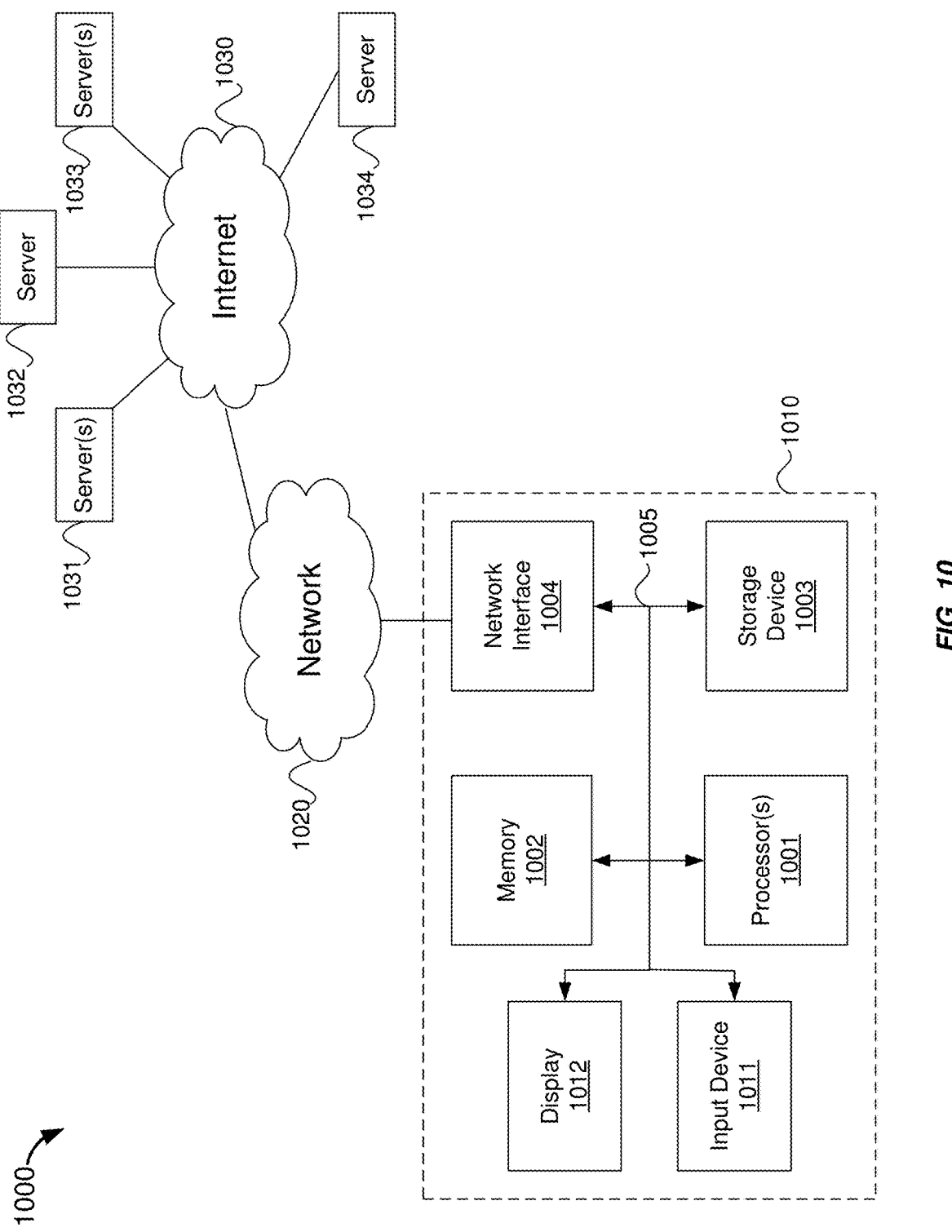
FIG. 10 shows a diagram of hardware of a special purpose computing machine for implementing systems and methods described herein.

FIG. 10 shows a diagram 1000 of hardware of a special purpose computing machine for implementing systems and methods described herein. The following hardware description is merely one example. It is to be understood that a variety of computers topologies may be used to implement the above described techniques. For instance, the computer system may implement the computer implemented method described.

An example computer system 1010 is illustrated in FIG. 10. Computer system 1010 includes a bus 1005 or other communication mechanism for communicating information, and one or more processor(s) 1001 coupled with bus 1005 for processing information. Computer system 1010 also includes a memory 1002 coupled to bus 1005 for storing information and instructions to be executed by processor 1001, including information and instructions for performing some of the techniques described above, for example. This memory 1002 may also be used for storing programs executed by processor(s) 1001. Possible implementations of this memory may be, but are not limited to, random access memory (RAM), read only memory (ROM), or both. As such, the memory 1002 is a non-transitory computer readable storage medium.

A storage device 1003 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1003 may include source code, binary code, or software files for performing the techniques above, for example. Storage device and memory are both examples of non-transitory computer readable storage mediums. For example, the storage device 1003 may store computer program code including instructions for implementing the method described above with respect to FIG. 2.

Computer system 1010 may be coupled using bus 1005 to a display 1012 for displaying information to a computer user. An input device 1011 such as a keyboard, touchscreen, and/or mouse is coupled to bus 1005 for communicating information and command selections from the user to processor 1001. The combination of these components allows

| MANDT | VBLEN | DATA_CTRL_NAME | PURP_NAME | AO_NAME |
|-------|-------|----------------|-----------|---------|
| 001 | 0000004632 | 0001 | SCHEDULING_AGREEMENT | SALESORDER |
| 001 | 0000004633 | 0001 | SCHEDULING_AGREEMENT | SALESORDER |
| 001 | 0000004733 | 0001 | PRE_TRADING | SALESORDER |
| 001 | 0000004733 | 0001 | TRADING | SALESORDER |

At 905, propose purpose for master data. For example, purposes may be proposed for master data consumed across AOs. In some embodiments, Business Partner (BP) master data may be used across various applications (AOs). Once the purposes for an AO instance are determined, the same purposes are proposed to be persisted in the BP which was used in this AO instance. For example, if a BP "XYZ" is used to create a Sales Order for the purposes "Medicines_ the user to communicate with the system. In some systems, bus 1005 represents multiple specialized buses, for example.

Computer system also includes a network interface 1004 coupled with bus 1005. Network interface 1004 may provide two-way data communication between computer system 1010 and a network 1020. The network interface 1004 may be a wireless or wired connection, for example. Computer system 1010 can send and receive information through the network interface 1004 across a local area network, an Intranet, a cellular network, or the Internet, for example. In the Internet example, a browser, for example, may access data and features on backend systems that may reside on multiple different hardware servers 1031, 1032, 1033, 1034 across the network. The servers 1031-1034 may be part of a cloud computing environment, for example.

Additional Embodiments

Additional embodiments are described below.

Some embodiments provide a computer system comprising one or more processors and one or more machine-readable medium coupled to the one or more processors and storing computer program code comprising sets of instructions executable by the one or more processors. The instructions executable to store a plurality of application objects and business scenarios, each application object linked to a particular data category of a plurality of data categories, linked with a name of a corresponding data object, and linked with primary key attributes of the corresponding data object, wherein each particular data category is linked to a purpose of a plurality of purposes, wherein each business scenario includes a set of application objects and a sequence for the set of application objects. The instructions executable to obtain a plurality of worklist entries generated in response to a particular instances of application objects for a plurality of different applications being created or modified. The instructions executable to for each worklist entry of the plurality of worklist entries, determine a particular one or more purposes for the particular application object of the worklist entry using purpose assignment rules for the particular application object. The instructions executable to store each of the one or more determined purposes for the particular application object in a purpose assignment table. The instructions executable to propose each determined purpose for master data to be used across the plurality of different applications.

In some embodiments of the computer system, the purpose assignment rules are based a link between a business scenario and a particular purpose.

In some embodiments of the computer system, the business scenario maps to multiple data objects in a specific sequence.

In some embodiments of the computer system, the business scenario is hierarchical and includes a primary scenario and one or more sub-scenarios.

In some embodiments of the computer system, the application object links a data object and a lifecycle management object, the lifecycle management object indicating a retention period.

In some embodiments of the computer system, the data category is representative of different categories of data sets within the master data.

In some embodiments of the computer system, the determined purposes proposed for the master data are integrated into the master data and are used across the plurality of different applications.

Some embodiments provide one or more non-transitory computer-readable medium storing computer program code comprising sets of instructions. The computer program code comprising sets of instructions to store a plurality of application objects and business scenarios, each application object linked to a particular data category of a plurality of data categories, linked with a name of a corresponding data object, and linked with primary key attributes of the corresponding data object, wherein each particular data category is linked to a purpose of a plurality of purposes, wherein each business scenario includes a set of application objects and a sequence for the set of application objects. The computer program code comprising sets of instructions to obtain a plurality of worklist entries generated in response to a particular instances of application objects for a plurality of different applications being created or modified. The computer program code comprising sets of instructions to, for each worklist entry of the plurality of worklist entries, determine one or more purposes for the particular application object of the worklist entry using purpose assignment rules for the particular application object. The computer program code comprising sets of instructions to store each of the one or more determined purposes for the particular application object in a purpose assignment table. The computer program code comprising sets of instructions to propose each determined purpose for master data to be used across the plurality of different applications.

In some embodiments of the non-transitory computer-readable medium, the purpose assignment rules are based a link between a business scenario and a particular purpose.

In some embodiments of the non-transitory computer-readable medium, the business scenario maps to multiple data objects in a specific sequence.

In some embodiments of the non-transitory computer-readable medium, the business scenario is hierarchical and includes a primary scenario and one or more sub-scenarios.

In some embodiments of the non-transitory computer-readable medium, the application object links a data object and a lifecycle management object, the lifecycle management object indicating a retention period.

In some embodiments of the non-transitory computer-readable medium, the data category is representative of different categories of data sets within the master data.

In some embodiments of the non-transitory computer-readable medium, the determined purposes proposed for the master data are integrated into the master data and are used across the plurality of different applications.

Some embodiments provide a computer-implemented method. The method comprises storing a plurality of application objects and business scenarios, each application object linked to a particular data category of a plurality of data categories, linked with a name of a corresponding data object, and linked with primary key attributes of the corresponding data object, wherein each particular data category is linked to a purpose of a plurality of purposes, wherein each business scenario includes a set of application objects and a sequence for the set of application objects. The method further comprises obtaining a plurality of worklist entries generated in response to a particular instances of application objects for a plurality of different applications being created or modified. The method further comprises, for each worklist entry of the plurality of worklist entries, determining one or more purposes for the particular application object of the worklist entry using purpose assignment rules for the particular application object. The method further comprises storing each of the one or more determined purposes for the particular application object in a purpose assignment table. The method further comprises proposing each determined purpose for master data to be used across the plurality of different applications.

In some embodiments of the computer-implemented method, the purpose assignment rules are based a link between a business scenario and a particular purpose.

In some embodiments of the computer-implemented method, the business scenario maps to multiple data objects in a specific sequence.

In some embodiments of the computer-implemented method, the business scenario is hierarchical and includes a primary scenario and one or more sub-scenarios.

In some embodiments of the computer-implemented method, the application object links a data object and a lifecycle management object, the lifecycle management object indicating a retention period.

In some embodiments of the computer-implemented method, the data category is representative of different categories of data sets within the master data, and wherein the determined purposes proposed for the master data are integrated into the master data and are used across the plurality of different applications.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:

one or more processors; and one or more machine-readable medium coupled to the one or more processors and storing computer program code comprising sets of instructions executable by the one or more processors to:

store a plurality of application objects and business scenarios, each application object comprising a machine-processable data structure that represents an identifiable business data entity managed within an enterprise application and linked to a particular data category of a plurality of data categories defining privacy or government classification, linked with a name of a corresponding data object comprising an underlying database or persistence model name, and linked with primary key attributes of the corresponding data object, wherein each particular data category is linked to a purpose of a plurality of purposes, wherein each business scenario includes a set of application objects and a sequence for the set of application objects;

obtain a plurality of worklist entries generated in response to a particular instances of application objects for a plurality of different applications being created or modified;

for each worklist entry of the plurality of worklist entries, determine one or more purposes for the particular application object of the worklist entry using a stored purpose-assignment rule that references the data category and the primary key attributes of the corresponding application object;

store each of the one or more determined purposes for the particular application object in a purpose assignment table; and integrate each determined purpose for master data to be used in the plurality of different applications.

2. The computer system of claim 1, wherein the purpose assignment rules are based a link between a business scenario and a particular purpose.

3. The computer system of claim 1, wherein the business scenario maps to multiple data objects in a specific sequence.

4. The computer system of claim 1, wherein the business scenario is hierarchical and includes a primary scenario and one or more sub-scenarios.

5. The computer system of claim 1, wherein the application object links a data object and a lifecycle management object, the lifecycle management object indicating a retention period.

6. The computer system of claim 1, wherein the data category is representative of different categories of data sets within the master data.

7. The computer system of claim 1, wherein the determined purposes proposed for the master data are integrated into the master data and are used across the plurality of different applications.

8. One or more non-transitory computer-readable medium storing computer program code comprising sets of instructions to:

store a plurality of application objects and business scenarios, each application object comprising a machine-processable data structure that represents an identifiable business data entity managed within an enterprise application and linked to a particular data category of a plurality of data categories defining privacy or government classification, linked with a name of a corresponding data object, and linked with primary key attributes of the corresponding data object comprising an underlying database or persistence model name, wherein each particular data category is linked to a purpose of a plurality of purposes, wherein each business scenario includes a set of application objects and a sequence for the set of application objects;

obtain a plurality of worklist entries generated in response to a particular instances of application objects for a plurality of different applications being created or modified;

for each worklist entry of the plurality of worklist entries, determine one or more purposes for the particular application object of the worklist entry using a stored purpose-assignment rule that references the data category and the primary key attributes of the corresponding application object;

store each of the one or more determined purposes for the particular application object in a purpose assignment table; and integrate each determined purpose for master data to be used in the plurality of different applications.

9. The non-transitory computer-readable medium of claim 8, wherein the purpose assignment rules are based a link between a business scenario and a particular purpose.

10. The non-transitory computer-readable medium of claim 8, wherein the business scenario maps to multiple data objects in a specific sequence.

11. The non-transitory computer-readable medium of claim 8, wherein the business scenario is hierarchical and includes a primary scenario and one or more sub-scenarios.

12. The non-transitory computer-readable medium of claim 8, wherein the application object links a data object and a lifecycle management object, the lifecycle management object indicating a retention period.

13. The non-transitory computer-readable medium of claim 8, wherein the data category is representative of different categories of data sets within the master data.

14. The non-transitory computer-readable medium of claim 8, wherein the determined purposes proposed for the master data are integrated into the master data and are used across the plurality of different applications.

15. A computer-implemented method, comprising:

storing a plurality of application objects and business scenarios, each application object comprising a machine-processable data structure that represents an identifiable business data entity managed within an enterprise application and linked to a particular data category of a plurality of data categories defining privacy or government classification, linked with a name of a corresponding data object comprising an underlying database or persistence model name, and linked with primary key attributes of the corresponding data object, wherein each particular data category is linked to a purpose of a plurality of purposes, wherein each business scenario includes a set of application objects and a sequence for the set of application objects;

obtaining a plurality of worklist entries generated in response to a particular instances of application objects for a plurality of different applications being created or modified;

for each worklist entry of the plurality of worklist entries, determining one or more purposes for the particular application object of the worklist entry using a stored purpose-assignment rule that references the data category and the primary key attributes of the corresponding application object;

storing each of the one or more determined purposes for the particular application object in a purpose assignment table; and integrating each determined purpose for master data to be used across the plurality of different applications.

16. The computer-implemented method of claim 15, wherein the purpose assignment rules are based a link between a business scenario and a particular purpose.

17. The computer-implemented method of claim 15, wherein the business scenario maps to multiple data objects in a specific sequence.

18. The computer-implemented method of claim 15, wherein the business scenario is hierarchical and includes a primary scenario and one or more sub-scenarios.

19. The computer-implemented method of claim 15, wherein the application object links a data object and a lifecycle management object, the lifecycle management object indicating a retention period.

20. The computer-implemented method of claim 15, wherein the data category is representative of different categories of data sets within the master data, and wherein the determined purposes proposed for the master data are integrated into the master data and are used across the plurality of different applications.

* * * * *